(12) United States Patent
Cranton et al.

(10) Patent No.: US 12,386,178 B2
(45) Date of Patent: Aug. 12, 2025

(54) INTEGRATED VISION CORRECTION WITH AUGMENTED REALITY DISPLAY

(71) Applicant: GOOGLE LLC, Mountain View, CA (US)

(72) Inventors: Brian Watson Cranton, Kitchener (CA); Darren Edward Ihmels, Stratford (CA); Lloyd Frederick Holland, Kitchener (CA); Cecilia Abadie, Motara, CA (US)

(73) Assignee: GOOGLE LLC, Mountain View, CA (US)

( * ) Notice: Subject to any disclaimer, the term of this patent is extended or adjusted under 35 U.S.C. 154(b) by 863 days.

(21) Appl. No.: 17/577,480

(22) Filed: Jan. 18, 2022

(65) Prior Publication Data
US 2023/0228994 A1    Jul. 20, 2023

(51) Int. Cl.
*G02B 27/01*    (2006.01)
*G02C 7/06*    (2006.01)

(52) U.S. Cl.
CPC ........... *G02B 27/0172* (2013.01); *G02C 7/06* (2013.01); *G02B 2027/014* (2013.01); *G02B 2027/0178* (2013.01); *G02C 2202/16* (2013.01)

(58) Field of Classification Search
CPC .......... G02B 27/0172; G02B 2027/014; G02B 2027/0178; G02C 7/06; G02C 2202/16; G02C 7/061; G02C 7/086; G02C 11/00
USPC .......................................................... 351/158
See application file for complete search history.

(56) References Cited

U.S. PATENT DOCUMENTS

| 10,546,430 | B1 | 1/2020 | Lu et al. | |
| 2017/0351117 | A1* | 12/2017 | Rousseau | G02B 6/0011 |
| 2019/0293938 | A1 | 9/2019 | Le Saux et al. | |
| 2020/0150424 | A1* | 5/2020 | Browy | G06F 3/011 |
| 2020/0333607 | A1* | 10/2020 | Hatzilias | H04N 23/56 |

OTHER PUBLICATIONS

International Preliminary Report on Patentability mailed Aug. 2, 2024 for PCT Application No. PCT/US2022/043442, 9 pages.
International Search Report and Written Opinion mailed Dec. 8, 2022 for PCT Application No. PCT/US2022/043442, 15 pages.

* cited by examiner

*Primary Examiner* — Henry Duong

(57) ABSTRACT

A lens specification for multiple lens layers of a lens structure is generated by one or more processors. A multi-focal correction (MFC) component is assigned to at least one lens layer of the multiple lens layers. Parameters are generated for a display optics (DO) lens layer comprising an augmented reality (AR) display, the DO lens layer having a first side for facing an eye of the user and a second side for facing away from the eye of the user. Parameters are generated for one or more eye side (ES) lens layers of the multiple lens layers to be disposed adjacent to the first side of the DO lens layer, and for one or more world side (WS) lens layers to be disposed adjacent to the second side of the DO lens layer. The generated lens specification is provided for use in production of the lens structure for the user.

31 Claims, 12 Drawing Sheets

INTEGRATED VISION CORRECTION WITH AUGMENTED REALITY DISPLAY

BACKGROUND

The present disclosure relates generally to augmented reality (AR) eyewear, which fuses a view of the real world with a heads up display overlay, and to vision correction via prescription eyewear such as such as refractive eyeglasses, which a significant number of humans need in order to see the real world clearly.

Prescription eyewear commonly corrects two different types of common vision ailments. An individual may have one or both ailment types. The first type, often termed ametropia or refractive error, includes nearsightedness (myopia), farsightedness (hyperopia), and astigmatism (in which the cornea and lens of the eye have mismatched curvature, causing blurred vision that cannot be corrected through simple refocusing of the eye). Typically, a large minority of the population is affected by these conditions regardless of age, and the majority of aberrations may be corrected via single-vision correction—that is, using a uniform refractive power across an entire lens. The second type of common vision ailment, termed presbyopia, is a lack of focus accommodation caused by a loss of elasticity in the lens of the eye. Presbyopia affects a majority (well over 90%) of the population in middle and old age, with onset typically beginning in an age range of 45-55 years, and requires multifocal correction.

Multifocal correction associates gaze angle with the distance at which good visual acuity is achieved. For a typical progressive spectacle or bifocal/trifocal spectacle implementation, this means distant objects are visually clear when viewed through an upper lens region and near objects are visually clear when viewed through a lower lens region. Users needing such multifocal correction do not typically benefit from approaches utilizing only a single uniform refractive lens correction.

For a user who benefits from single vision correction and/or prism refractive correction (such as a hyperopic, myopic, astigmatic, or strabismic user), both the view of the real world and of a heads-up display (such as may be presented via eyeglasses, a hololens display, or other wearable display device) may need refractive correction to be seen with good visual acuity. Typical approaches to this issue have been accomplished by first fusing the view of the real world and the display with some form of combiner, and then applying a single refractive correction to this fused view.

For a user who does not need vision correction via prescription eyewear (an emmetrope), no corrective assistance is needed to simultaneously see both the real world beyond a set of eyeglasses and a heads-up display presented via such eyeglasses with good visual acuity. However, if the display is presented at a close distance, a person without visual aberrations may still require multifocal correction, such as to compensate for presbyopia.

BRIEF SUMMARY OF EMBODIMENTS

Embodiments are described herein in which a lens specification for multiple lens layers of a lens structure is generated by one or more processors. A multifocal correction (MFC) component is assigned to at least one lens layer of the multiple lens layers. Parameters are generated for a display optics (DO) lens layer including an augmented reality (AR) display, the DO lens layer having a first side for facing an eye of the user and a second side for facing away from the eye of the user. Parameters are also generated for one or more eye side (ES) lens layers of the multiple lens layers to be disposed adjacent to the first side of the DO lens layer, and for one or more world side (WS) lens layers to be disposed adjacent to the second side of the DO lens layer. The generated lens specification is provided for use in production of the lens structure for the user.

In certain embodiments, a processor-implemented method may include receiving, with one or more processors, assessment information regarding optical vision correction for a user; generating, by the one or more processors and based at least in part on the assessment information, a lens specification for multiple lens layers of a lens structure; and providing, by the one or more processors, the generated lens specification for use in production of the lens structure for the user. The generating of the lens specification may include assigning a multifocal correction (MFC) component to at least one lens layer of the multiple lens layers; generating one or more parameters for a display optics (DO) lens layer including an augmented reality (AR) display, the DO lens layer having a first side for facing an eye of the user and a second side for facing away from the eye of the user; generating parameters for one or more eye side (ES) lens layers of the multiple lens layers to be disposed adjacent to the first side of the DO lens layer; and generating parameters for one or more world side (WS) lens layers of the multiple lens layers to be disposed adjacent to the second side of the DO lens layer.

Assigning the MFC component may include assigning a MFC component to a first ES lens layer of the one or more ES lens layers, such that the method further comprises analyzing one or more regions of the first ES lens layer to identify a first region in which a change in optical power of the MFC component is below a defined threshold, and determining a position in which to place the AR display of the DO lens layer based at least in part on a location of the first region of the first ES lens layer. The method may further comprise, responsive to analyzing the one or more regions of the first ES lens layer, determining to modify the first region by modifying the MFC component assigned to the first ES lens layer. To modify the MFC component assigned to the first ES lens layer may include to modify the MFC component by taking at least one action of a group of actions, the group including limiting a change of optical power within the first region, modifying a size and/or shape of the first region, and modifying a location of the first region.

Assigning the MFC component may include assigning a MFC component to a first WS lens layer of the one or more WS lens layers, such that the method further comprises analyzing one or more regions of the first WS lens layer to identify a first region in which a change in optical power of the MFC component is below a defined threshold, and determining a position in which to place the AR display of the DO lens layer based at least in part on a location of the first region of the first WS lens layer. The method may further comprise, responsive to analyzing the one or more regions of the first ES lens layer, determining to modify the first region by modifying the MFC component assigned to the first WS lens layer. To modify the MFC component assigned to the first WS lens layer may include to modify the MFC component by taking at least one action of a group of actions, the group including limiting a change of optical power within the first region, modifying a size and/or shape of the first region, and modifying a location of the first region.

Generating the lens specification may further comprise assigning a first distance shift (DS) component to a first ES lens layer of the one or more ES lens layers; and assigning a second DS component to a first WS lens layer of the one or more WS lens layers, the second DS component having an equal but opposite optical power as the first DS component. The one or more WS lens layers may include multiple WS lens layers, such that generating the lens specification includes assigning one or more MFC components to a second WS lens layer of the multiple WS lens layers, and such that the first WS lens layer is disposed between the DO lens layer and the second WS lens layer.

The AR display of the DO lens layer may include an incoupling light guide and an outcoupling light guide, and generating the lens specification may include determining a position in which to place the outcoupling light guide based at least in part on assessing a change in optical power within one or more regions of at least one lens layer of the multiple lens layers. Generating the lens specification may further include modifying a corrective component of the at least one lens layer to create a first region of the at least one lens layer in which a change of optical power within the first region is below a defined threshold. Generating the lens specification may further include determining a size for the outcoupling light guide based at least in part on the assessing of the change in optical power within the one or more regions.

The MFC component in a first region of the at least one lens layer may be modified, based at least in part on a position of the AR display of the DO lens layer, to include a first region having a total change in optical power that is below a defined threshold.

Generating the lens specification may include assigning a set of plano parameters to a first lens layer of the multiple lens layers, such that the first lens layer has no optical corrective components.

In certain embodiments, a non-transitory computer readable medium may embody a set of executable instructions, the set of executable instructions to manipulate at least one processor to perform some or all of the methods described above.

In certain embodiments, a lens structure may include multiple lens layers, such that the lens structure includes a display optics (DO) lens layer including an augmented reality (AR) display, the DO lens layer having a first side for facing an eye of the user and a second side for facing away from the eye of the user; one or more eye side (ES) lens layers disposed adjacent to the first side of the DO lens layer; and one or more world side (WS) lens layers disposed adjacent to the second side of the DO lens layer. At least one of the multiple lens layers may include a multifocal corrective (MFC) component.

A first ES lens layer of the one or more ES lens layers may include an MFC component, and the AR display of the DO lens layer may be positioned based at least in part on a size and location of a first region of the first ES lens layer, such that the first region includes a total change in optical power of the MFC component in the first region that is below a defined threshold. The MFC component of the first ES lens layer may be based on assessment information regarding optical vision correction for a user, and the MFC component in the first region may be modified responsive to analyzing one or more regions of the first ES lens layer. To modify the MFC component in the first region may include to take at least one action of a group of actions that includes limiting a change of optical power within the first region, modifying a size and/or shape of the first region, and modifying a location of the first region.

A first WS lens layer of the one or more WS lens layers may include an MFC component, and the AR display of the DO lens layer may be positioned based at least in part on a size and location of a first region of the first WS lens layer, the first region including a total change in optical power of the MFC component in the first region that is below a defined threshold. The MFC component of the first WS lens layer may be based on assessment information regarding optical vision correction for a user, such that the MFC component in the first region is modified responsive to analyzing one or more regions of the first WS lens layer. To modify the MFC component in the first region may include to take at least one action of a group of actions that includes limiting a change of optical power within the first region, modifying a size and/or shape of the first region, and modifying a location of the first region.

A first ES lens layer of the one or more ES lens layers may include a first distance shift (DS) component, and a first WS lens layer of the one or more WS lens layers may include a second DS component that has an equal but opposite optical power as the first DS component. The one or more WS lens layers may include multiple WS lens layers, such that a second WS lens layer of the multiple WS lens layers includes one or more MFC components, and such that the first WS lens layer is disposed between the DO lens layer and the second WS lens layer.

The AR display of the DO lens layer may include an incoupling light guide and an outcoupling light guide, such that the outcoupling light guide is positioned based at least in part on assessing a change in optical power within one or more regions of at least one lens layer of the multiple lens layers. A size for the outcoupling light guide may be determined based at least in part on the assessing of the change in optical power within the one or more regions.

A first lens layer of the multiple lens layers may be assigned a set of plano parameters, such that the first lens layer has no optical corrective components.

In certain embodiments, a head wearable display (HWD) device may include a lens structure having multiple lens layers, the lens structure including a display optics (DO) lens layer that includes an augmented reality (AR) display, the DO lens layer having a first side for facing an eye of the user and a second side for facing away from the eye of the user; one or more eye side (ES) lens layers disposed adjacent to the first side of the DO lens layer; and one or more world side (WS) lens layers disposed adjacent to the second side of the DO lens layer. At least one of the multiple lens layers may include a multifocal corrective (MFC) component.

A first ES lens layer of the one or more ES lens layers may include an MFC component; and the AR display of the DO lens layer may be positioned based at least in part on a size and location of a first region of the first ES lens layer, such that the first region includes a total change in optical power of the MFC component in the first region that is below a defined threshold. The MFC component of the first ES lens layer may be based on assessment information regarding optical vision correction for a user, and the MFC component in the first region may be modified responsive to analyzing one or more regions of the first ES lens layer. To modify the MFC component in the first region may include to take at least one action of a group of actions that includes limiting a change of optical power within the first region, modifying a size and/or shape of the first region, and modifying a location of the first region.

A first WS lens layer of the one or more WS lens layers may include an MFC component, and the AR display of the DO lens layer may be positioned based at least in part on a size and location of a first region of the first WS lens layer, such that the first region includes a total change in optical power of the MFC component in the first region that is below a defined threshold. The MFC component of the first WS lens layer may be based on assessment information regarding optical vision correction for a user, and the MFC component in the first region may be modified responsive to analyzing one or more regions of the first WS lens layer. To modify the MFC component in the first region may include to take at least one action of a group of actions that includes limiting a change of optical power within the first region, modifying a size and/or shape of the first region, and modifying a location of the first region.

A first ES lens layer of the one or more ES lens layers may include a first distance shift (DS) component, and a first WS lens layer of the one or more WS lens layers may include a second DS component that has an equal but opposite optical power as the first DS component.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

FIG. 4-1 illustrates single vision correction in relation to a presbyopic user's gaze angle through a lens layer of a multilayer lens structure providing an SVC optical component in accordance with some embodiments.

FIG. 4-2 illustrates multifocal correction in relation to a presbyopic user's gaze angle through a lens layer of a multilayer lens structure providing an MFC optical component in accordance with some embodiments.

FIGS. 7-1 through 7-3 present topographical representations of a lens layer used to implement a multifocal corrective component, such as may be used in a multilayer lens structure specified in accordance with certain embodiments.

DETAILED DESCRIPTION

Generally, embodiments of techniques described herein pertain to introducing a heads-up augmented reality (AR) display into a person's vision while still maintaining the vision correction required to see the real world and the AR display clearly, including one or both of single-vision refractive correction and multifocal refractive correction. In certain embodiments, one or more various actions may be used to this effect. As non-limiting examples, such actions may include: determining a magnitude of a perceived distance shift for an AR display in the user's field of view; evaluating one or more areas of a lens structure and/or one or more lens layers of that lens structure in order to identify a stable optical power region in the user's field of view; modifying one or more multifocal corrective components to create, shape, and/or position a stable optical power region in the user's field of view; and modifying a configuration of the AR display in the user's field of view, such as by modifying a shape and position of the AR display to substantially correspond to those of a created or identified stable optical power region. One objective of these actions is to maintain good multifocal correction of the real world while optimizing the size and shape of the region in which an AR display may be presented to the user with good visual acuity. As used herein, optical power refers to a degree to which a lens, mirror, or other optical system converges or diverges light.

Figure 1:
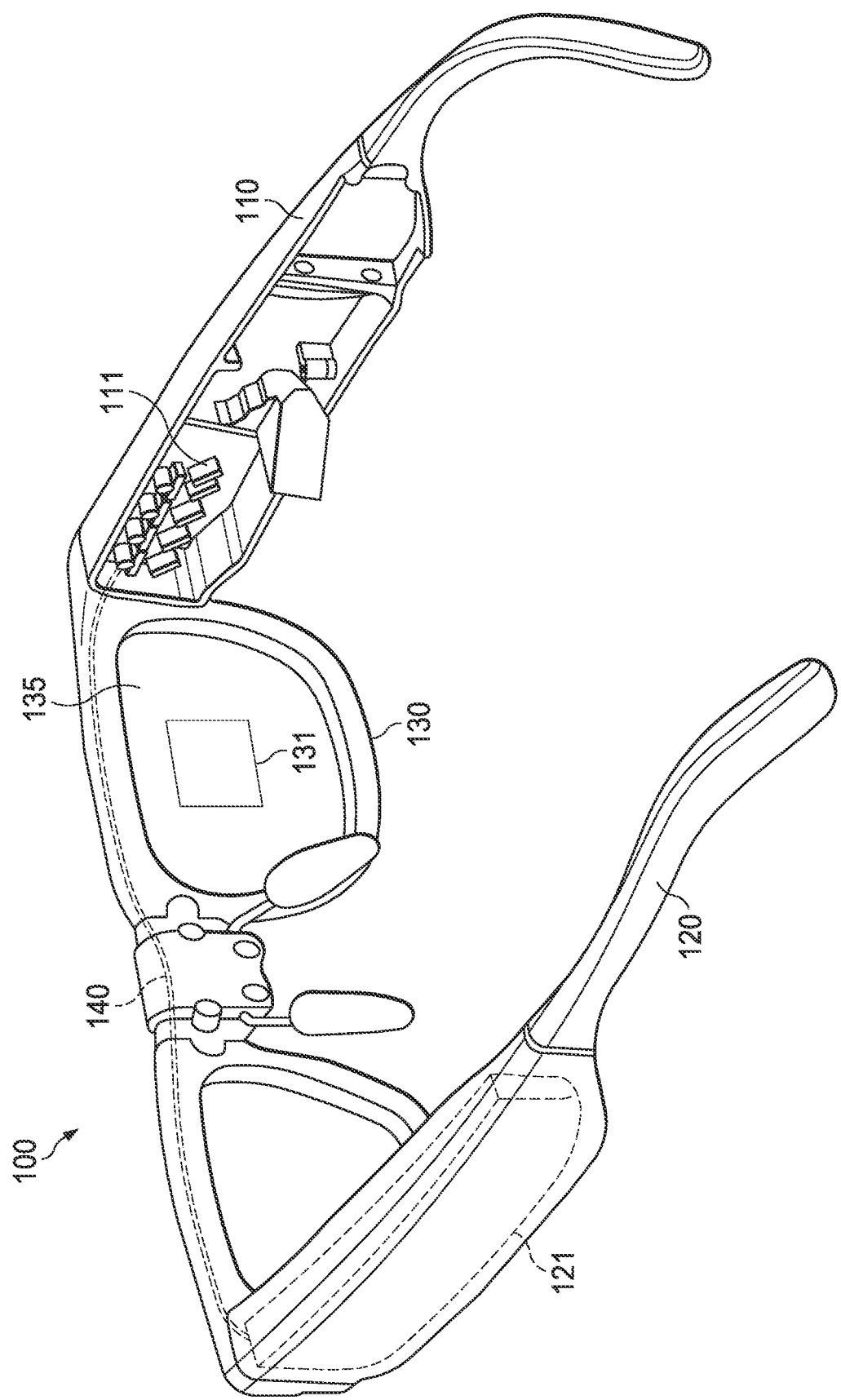
FIG. 1 illustrates an example wearable display device 100 in accordance with some embodiments.

FIG. 1 illustrates an example wearable display device 100 in accordance with some embodiments. The wearable display device 100 includes a support structure which includes a first arm 110, a second arm 120, and a front frame 130, which is physically coupled to the first arm 110 and the second arm 120. When worn by a user, the first arm 110 may be positioned on a first side of a head of the user, while the second arm 120 may be positioned on a second side of the head of the user opposite to the first side of the head of the user, and the front frame 130 may be positioned on a front side of the head of the user. The first arm 110 carries a light engine 111 which outputs light representative of augmented reality (AR) content to be viewed by a user. The first arm 110 may also optionally carry several additional components of the wearable display device 100, such as a processor, a non-transitory processor-readable storage medium, or a power supply circuit, among other examples. The front frame 130 carries a lens structure 135 with display optics 131 (in this example, an optical redirector) in a field-of-view of the user to receive light output from the light engine 111 and redirect this light to form AR content to be viewed by the user in conjunction with a view of the real world—the physical world viewed by the user and which physically exists beyond the display assembly.

In the example of FIG. 1, the display may be a monocular display visible to a right eye of the user. The second arm 120 as shown in FIG. 1 carries a power source 121, which powers the components of the wearable display device 100. The front frame 130 carries a set of electrically conductive current paths 140, which provide electrical coupling between the power source 121 and the light engine 111, and any other electrical components carried by the first arm 110. The term power source as used herein can refer to a component which provides electrical power, which may include a source of stored power such as a battery (e.g., a chemical battery, a mechanical battery), or a power generation system, such as piezoelectric elements, solar cells, or similar. A set of electrically conductive current paths as used herein can refer to a single electrically conductive current path, such as a wire or conductive trace on a printed circuit board, as well as a plurality of electrically conductive current paths, such as a plurality of wires or a plurality of conductive traces on a printed circuit board.

In various embodiments, aspects of the example wearable display device may be modified from the depicted example in various ways. For example, in certain embodiments the orientation of the wearable display device 100 may be reversed, such that the display is presented to a left eye of a user instead of the right eye. The second arm 120 could carry a light engine similar to the light engine 111 carried by the first arm 110, and the front frame 130 could also carry another lens structure similar to the lens structure 135, such that wearable display device 100 presents a binocular display to both a right eye and a left eye of a user.

The light engine 111 and the display optics 131 can include any appropriate display architecture for outputting light and redirecting the light to form a display to be viewed by a user. For example, the light engine 111 and any of the light engines discussed herein, could include a component selected from a group including at least: one of a projector, a scanning laser projector, a micro-display, a white-light source, or any other display technology as appropriate for a given application. The display optics 131 may include an optical component selected from a group including at least: a light guide (references to which, as used herein, include and encompass both light guides and wave guides), at least one holographic optical element, at least one prism, a diffraction grating, at least one light reflector, a light reflector array, at least one light refractor, a light refractor array, or any other light-redirection technology as appropriate for a given application, positioned and oriented to redirect the AR content towards the eye of the user. In various embodiments, the display optics may present visual information in color, one or more monochromatic display ranges, grayscale, etc.

The lens structure 135 may include multiple lens layers, each of which may be disposed closer to an eye of the user than the display optics 131 (eye side) or further from the eye of the user than the display optics 131 (world side). A lens layer can for example be molded or cast, may include a thin film or coating, and may include one or more transparent carriers. A transparent carrier as described herein may refer to a material which acts to carry or support an optical redirector. As one example, a transparent carrier may be an eyeglasses lens or lens assembly. In addition, in certain embodiments one or more of the lens layers may be implemented as a contact lens.

Non-limiting example display architectures could include scanning laser projector and holographic optical element combinations, side-illuminated optical light guide displays, pin-light displays, or any other wearable heads-up display technology as appropriate for a given application. Various example display architectures are described in at least U.S. Provisional Patent Application No. 62/754,339, U.S. Provisional Patent Application Ser. No. 62/782,918, U.S. Provisional Patent Application Ser. No. 62/789,908, U.S. Provisional Patent Application Ser. No. 62/845,956, and U.S. Provisional Patent Application Ser. No. 62/791,514. The term light engine as used herein is not limited to referring to a singular light source, but can also refer to a plurality of light sources, and can also refer to a light engine assembly. A light engine assembly may include some components which enable the light engine to function, or which improve operation of the light engine. As one example, a light engine may include a light source, such as a laser or a plurality of lasers. The light engine assembly may additionally include electrical components, such as driver circuitry to power the at least one light source. The light engine assembly may additionally include optical components, such as collimation lenses, a beam combiner, or beam shaping optics. The light engine assembly may additionally include beam redirection optics, such as least one MEMS mirror, which can be operated to scan light from at least one laser light source, such as in a scanning laser projector. In the above example, the light engine assembly includes a light source and also components, which take the output from at least one light source and produce conditioned display light to convey AR content. All of the components in the light engine assembly may be included in a housing of the light engine assembly, affixed to a substrate of the light engine assembly, such as a printed circuit board or similar, or separately mounted components of a wearable heads-up display (WHUD). Certain light engine assemblies are discussed in U.S. Provisional Patent Application No. 62/916,297.

Figure 2:
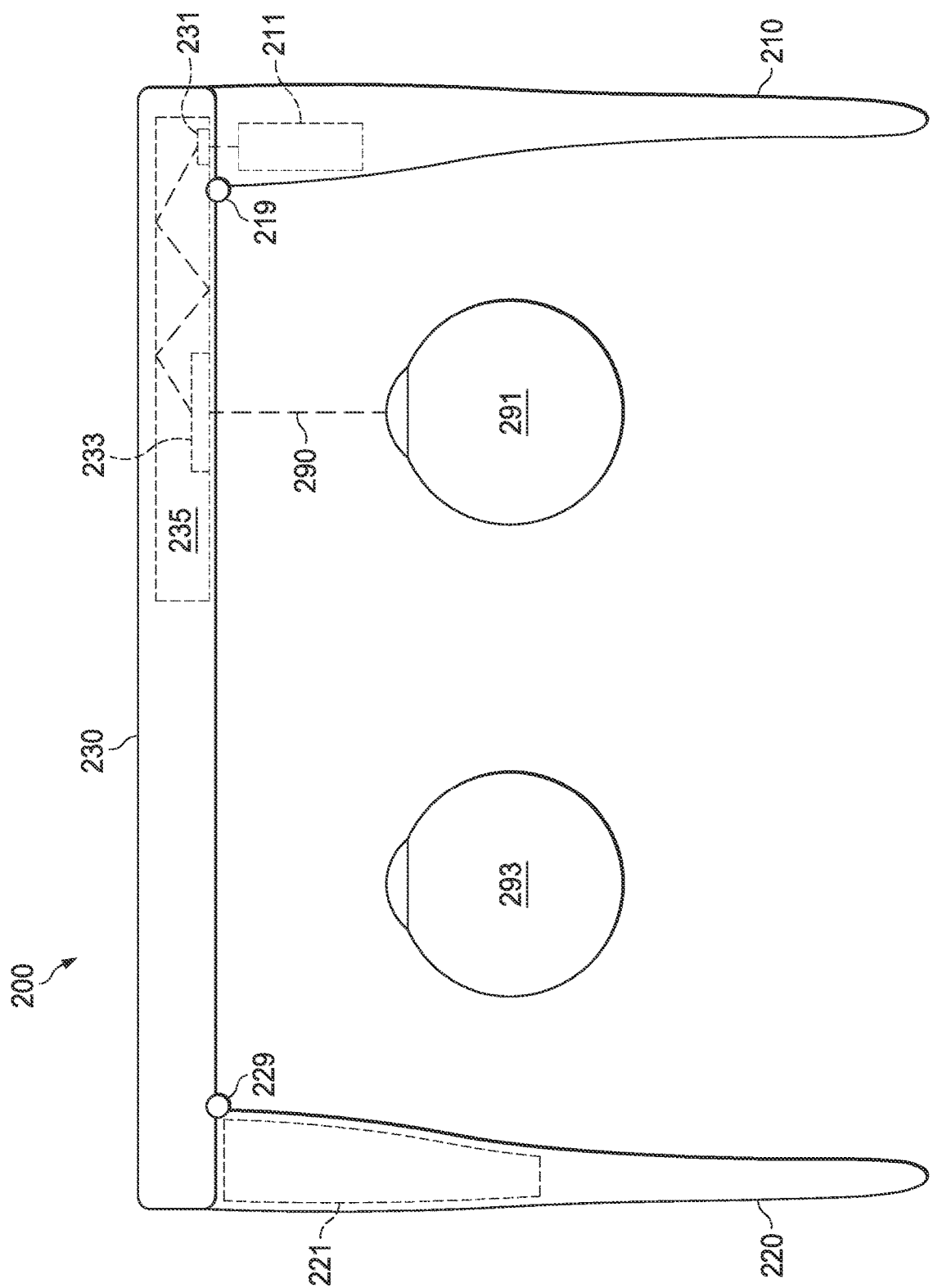
FIG. 2 illustrates a diagram of a wearable display device that includes a multilayer lens structure in accordance with some embodiments.

FIG. 2 illustrates a diagram of a wearable display device 200 in accordance with some embodiments. In some embodiments, the wearable display device 200 may implement or be implemented by aspects of the wearable display device 100. For example, the wearable display device 200 may include a first arm 210, a second arm 220, and a front frame 230. The first arm 210 may be coupled to the front frame 230 by a hinge 219, which allows the first arm 210 to rotate relative to the front frame 230. The second arm 220 may be coupled to the front frame 230 by the hinge 229, which allows the second arm 220 to rotate relative to the front frame 230.

In the example of FIG. 2, the wearable display device 200 may be in an unfolded configuration, in which the first arm 210 and the second arm 220 are rotated such that the wearable display device 200 can be worn on a head of a user, with the first arm 210 positioned on a first side of the head of the user, the second arm 220 positioned on a second side of the head of the user opposite the first side, and the front frame 230 positioned on a front of the head of the user. The first arm 210 and the second arm 220 can be rotated towards the front frame 230, until both the first arm 210 and the second arm 220 are approximately parallel to the front frame 230, such that the wearable display device 200 may be in a compact shape that fits conveniently in a rectangular, cylindrical, or oblong case. Alternatively, the first arm 210 and the second arm 220 may be fixedly mounted to the front frame 230, such that the wearable display device 200 cannot be folded.

In FIG. 2, the first arm 210 carries a light engine 211. The second arm 220 carries a power source 221. The front frame 230 carries display optics 235 including an incoupling optical redirector 231, an outcoupling optical redirector 233, and at least one set of electrically conductive current paths, which provide electrical coupling between the power source 221 and electrical components (such as the light engine 211) carried by the first arm 210. Such electrical coupling could be provided indirectly, such as through a power supply circuit, or could be provided directly from the power source 221 to each electrical component in the first arm 210. As used herein, the terms carry, carries or similar do not necessarily dictate that one component physically supports another component. For example, it is stated above that the first arm 210 carries the light engine 211. This could mean that the light engine 211 is mounted to or within the first arm 210, such that the first arm 210 physically supports the light engine 211. However, it could also describe a direct or indirect coupling relationship, even when the first arm 210 is not necessarily physically supporting the light engine 211.

The light engine 211 can output a display light 290 representative of AR content or other display content to be viewed by a user. The display light 290 can be redirected by display optics 235 towards an eye 291 of the user, such that the user can see the AR content. The display light 290 from the light engine 211 impinges on the incoupling optical redirector 231 and is redirected to travel in a volume of the display optics 235, where the display light 290 is guided through the light guide, such as by total internal reflection or light guide surface treatments like holograms or reflective coatings. Subsequently, the display light 290 traveling in the volume of the display optics 235 impinges on the outcoupling optical redirector 233, which redirects the display light 290 out of the light guide redirector and towards the eye 291 of a user. Example WHUD display architectures are described in at least U.S. Provisional Patent Application No. 62/754,339, U.S. Provisional Patent Application Ser. No. 62/782,918, U.S. Provisional Patent Application Ser. No. 62/789,908, U.S. Provisional Patent Application Ser. No. 62/845,956, and U.S. Provisional Patent Application Ser. No. 62/791,514.

The wearable display device 200 may include a processor (not shown) that is communicatively coupled to each of the electrical components in the wearable display device 200, including but not limited to the light engine 211. The processor can be any suitable component which can execute instructions or logic, including but not limited to a microcontroller, microprocessor, multi-core processor, integrated-circuit, ASIC, FPGA, programmable logic device, or any appropriate combination of these components. The wearable display device 200 can include a non-transitory processor-readable storage medium, which may store processor readable instructions thereon, which when executed by the processor can cause the processor to execute any number of functions, including causing the light engine 211 to output the light 290 representative of display content to be viewed by a user, receiving user input, managing user interfaces, generating display content to be presented to a user, receiving and managing data from any sensors carried by the wearable display device 200, receiving and processing external data and messages, and any other functions as appropriate for a given application. The non-transitory processor-readable storage medium can be any suitable component, which can store instructions, logic, or programs, including but not limited to non-volatile or volatile memory, read only memory (ROM), random access memory (RAM), FLASH memory, registers, magnetic hard disk, optical disk, or any combination of these components.

Figure 3:
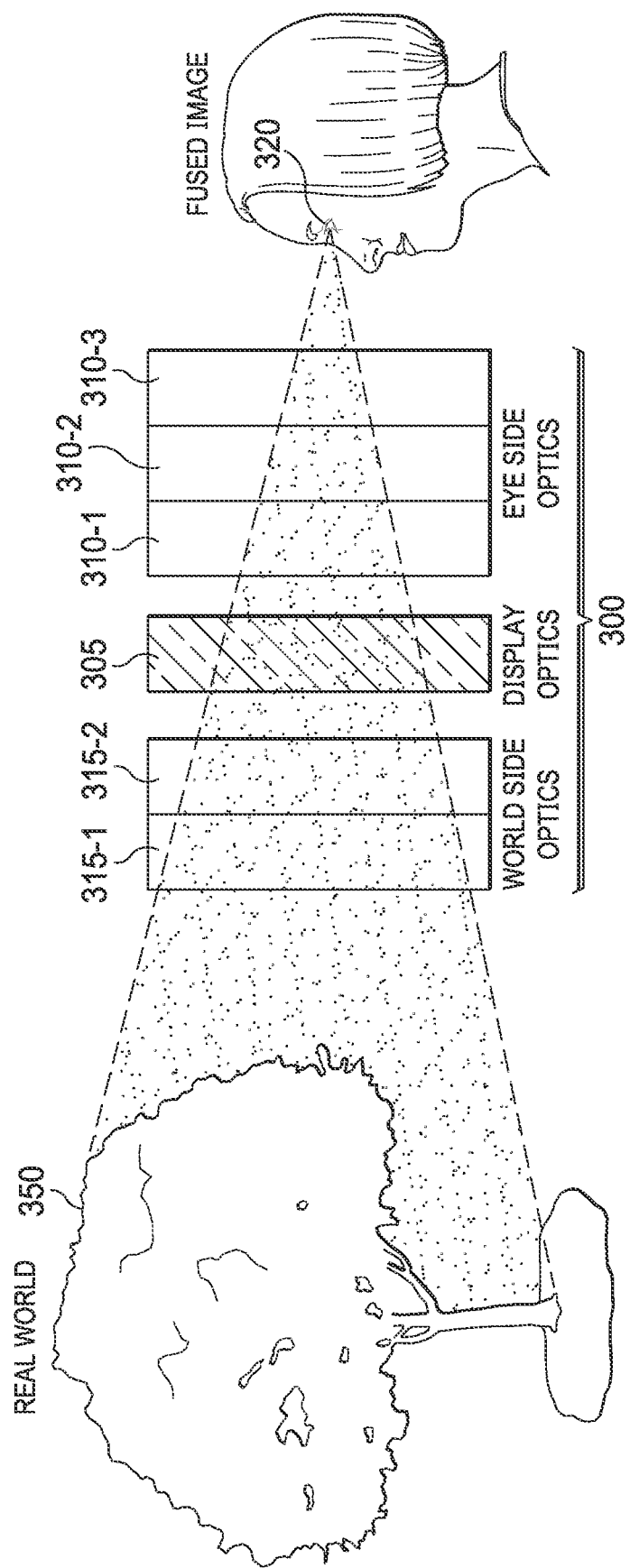
FIG. 3 presents a block diagram of an example multilayer lens structure, such as may be designed and/or specified by a lens structure specification (LSS) system executing one or more techniques described herein in accordance with some embodiments.

FIG. 3 presents a block diagram of a lens structure 300, such as may be designed and/or specified by one or more implementations of a lens structure specification (LSS) system executing one or more techniques described herein. The lens structure 300 may, for example, be used as a single "lens" for use as part of the wearable display device 100 of FIG. 1 and/or wearable display device 200 of FIG. 2.

In the depicted embodiment, the lens structure 300 includes a display optics (DO) layer 305. As used herein, display optics generally refers to one or more presentation elements used to introduce AR content into a user's field of view, typically via a wearable display assembly such as eyeglasses. In certain embodiments, for example, a lens structure of a display assembly (also referred to herein as a lens "stack" or lens display stack) may include multiple lens layers, with one or more display optics (e.g., one or more optical redirector elements) disposed between such lens layers to produce a heads-up display (HUD), such as to present AR content or other display content. The lens structure 300 further includes three lens layers (310-1, 310-2, and 310-3, respectively) disposed on the "eye side" of the DO layer 305, indicating that they are disposed between the DO layer and an eye of a user 320; and two lens layers (315-1 and 315-2, respectively) disposed on the "world side" of the DO layer, indicating that they are disposed between the DO layer and the real world 350 (the physical world viewed by the user and which physically exists beyond the display assembly). During use of the lens structure, the user's perception of the real world 350 is filtered through any vision corrective components assigned to each of the lens layers of the lens structure 300, with the user's perception of the AR content presented via the DO layer 305 being affected only by the eye side layers 310 and their perception of the real world 350 being affected by both the eye side layers 310 and the world side layers 315.

Each particular lens layer of a lens structure may therefore be referred to as either World Side (WS) or Eye Side (ES), depending on its relative position with respect to any display optics included in the overall lens structure. An AR implementation of a lens structure in accordance with one or more embodiments described herein may be generally represented as "WSO/DO/ESO", meaning one or more lens layers of world side optics, followed by display optics, followed by one or more lens layers of eye side optics. It will be appreciated that because WS layers are located beyond the user's view of the DO layer, only ES layers affect the user's perception of the AR content conveyed via the display optics.

A display shift (DS) is a perceived shift integrated into such a lens structure in order to affect the user-perceived distance (the perceived display distance or PDD) of the AR content introduced in this manner. With no display shift, the AR content is typically perceived as being located at infinity—at an "infinite" distance from the user, such as how stars appear when viewing the night sky. As display shift is added, the AR content is instead perceived to be located at finite distances from the user. Typically, such display shift only impacts the perceived distance of the AR content, rather than that of objects within the real world.

As one illustrative example, assume that rather than appearing as if it were located at an infinite distance from the user, it is desirable to place the AR content in the user's vision as if it were located at a distance of 2 meters from the user. In order to do so, an eye side display shift (ESS) of −0.5 diopter power may be used (diopter is a unit of refractive power equal to the reciprocal of the focal length in meters). However, that −0.5 diopter power will result in the user having a blurred perception of the real world beyond the user's eyewear. Therefore, an optically opposed world side display shift (WSS) of +0.5 diopter power may be used to counter the ESS, placing the AR content at a perceived distance of 2 m without otherwise affecting the user's focus on the real world.

For multifocal correction (MFC) eyewear, each lens layer of a lens structure may be an MFC layer, a single-vision correction (SVC) layer, or a distance shift (DS) layer, which may also be referred to as "plano" to indicate that no net optical power is provided by that layer. MFC layers include optical attributes which change focus distance with gaze angle. World side multifocal correction (WSMFC) only shifts focus distance of the real world view, and not of the display. Thus, accommodating a wide range of patient optical prescriptions may require bespoke, custom, or a large array of stock world side optics (WSO), which may include one or more world side shift (WSS) layers to shift perceived display distance, one or more world side single-vision correction (WSSVC) layers, and/or one or more world side multifocal correction (WSMFC) layers. Similarly, accommodating a wide range of patient optical prescriptions may require a large stock of eye side optics (ESO), which may include one or more eye side shift (ESS) layers, one or more eye side single-vision correction (ESSVC) layers, and/or one or more eye side multifocal correction (ESMFC) layers. Total multifocal correction (TMFC) refers to the optical power sum of WSMFC+ESMFC, and corresponds to the user's added focal distance shift of the real world.

In certain embodiments, techniques described herein apply to a multifocal AR implementation, utilizing WSMFC and ESMFC such that "WSO/DO/ESO" generally expands to "WSMFC+WSS/DO/ESMFC+ESS+ESSVC," although it will be appreciated that one or more of those components may be assigned plano parameters, such that no optical power correction is provided for that component. For example, if no multifocal correction is needed on the eye side—that is, if the ESMFC is zero—such an implementation effectively becomes "WSMFC+WSS/DO/ESS+ESSVC".

General purpose AR-presenting lens structures may be used to view real world objects both near and distant. Achieving this general purpose functionality requires such lens structures to be equipped with multifocal correction that does not interfere with the user's view of the AR display. A typical emmetropic teenage human eye may be able to focus clearly on objects at distances of 0.10 meters to infinity, giving that user an accommodation amplitude of 10 diopters. Meanwhile a typical emmetropic 60 year old presbyopic human eye may only be able to focus clearly on objects at distances from 1.00 meters to infinity, giving that user an accommodation amplitude of 1 diopters. Accommodation amplitude (AA) is the user's visual distance focus range, which typically decreases with age due to presbyopia. Alternatively stated, accommodation amplitude is the sum of the user's static depth of focus and dynamic focus accommodation—the maximum potential increase in the user's optical focusing power. Effective accommodation amplitude (EAA) is the user's visual distance focus range at some level of reduced visual acuity. For objects which require very good visual acuity to interpret, such as the fine printed text on the 20/20 line of a Snellen visual acuity chart, a user's effective accommodation amplitude equals that user's accommodation amplitude. For objects which require reduced visual acuity to interpret, such as the large printed text on the 20/100 line of that Snellen visual acuity chart, effective accommodation amplitude may be larger than accommodation amplitude (e.g., 1.5 diopters larger in the case of 20/100 text). In extended wear cases, effective accommodation amplitude is limited to the effective accommodation amplitude which can comfortably be maintained without eye strain or other negative symptoms.

Figures 1, 4:
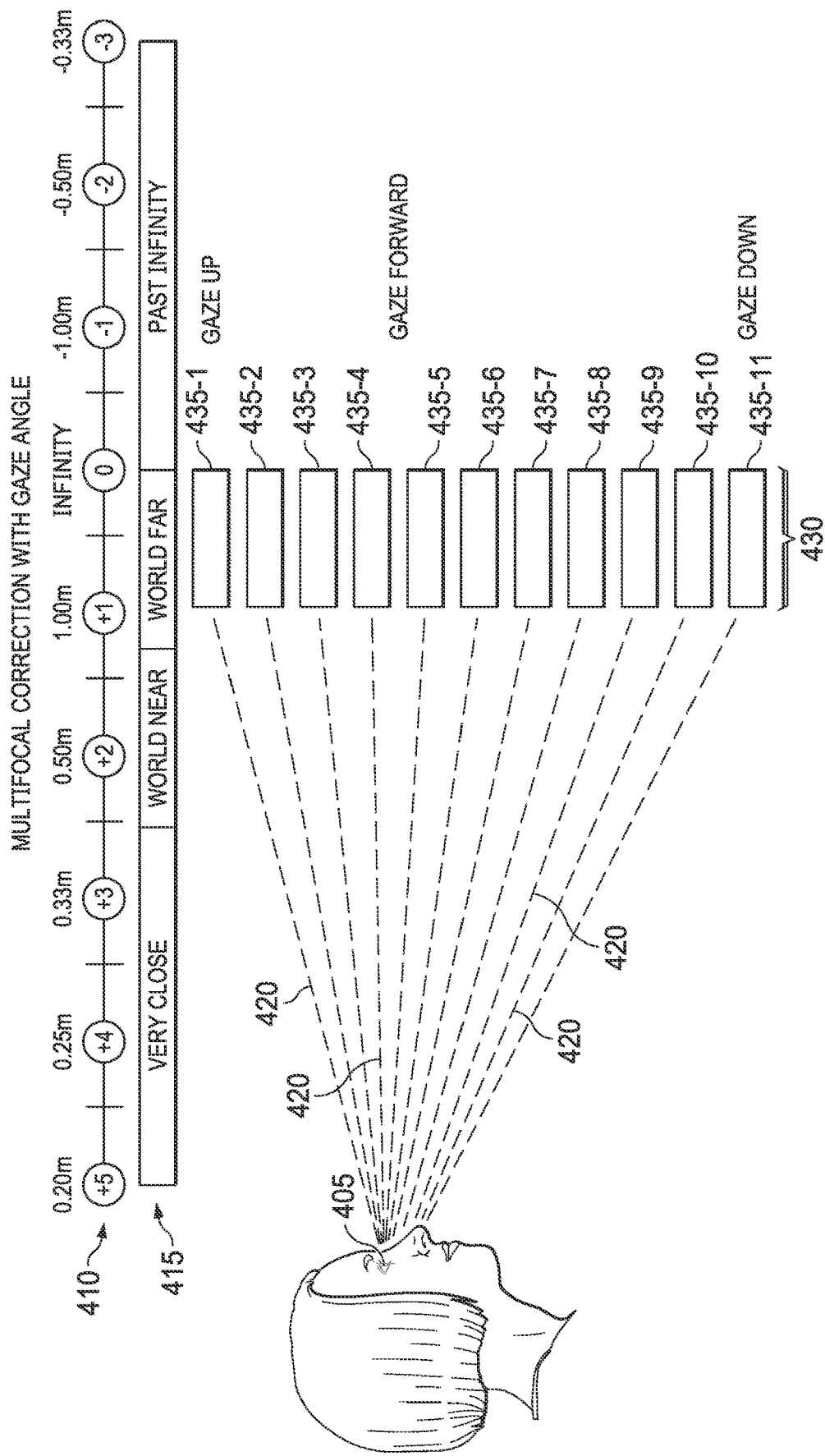
Figures 2, 4:
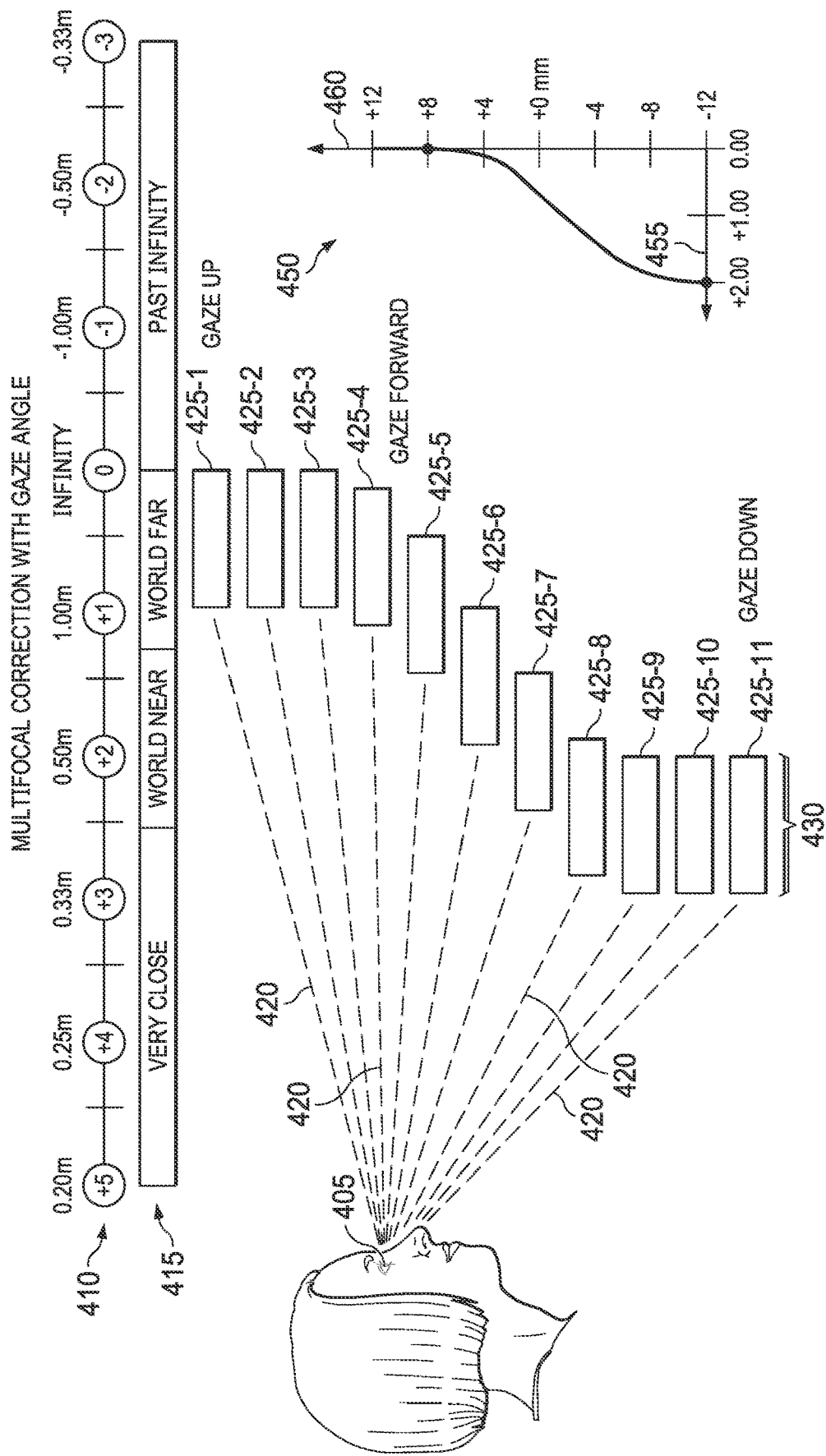

FIG. 4-1 illustrates single vision correction for a presbyopic user's eye 405 in relation to an angle of that user's gaze through a single-vision corrective lens—or, if utilized within a multilayer lens structure, a lens layer providing an SVC optical component. A diopter scale 410 indicates the optical power associated with objects presented at a particular focal distance: +5 diopters at a distance of 0.20 m; +4 diopters at a distance of 0.25 m; and so on. These distances are colloquially identified via a range descriptor 415. Gaze angle identifiers 420 generally correspond to a series of acuity distance ranges 425-1 through 425-11 (collectively referred to herein as acuity distance ranges 425). The user's accommodation amplitude AA of a single diopter, indicating that the user can focus clearly on objects at distances of 1.00 m to infinity, is depicted via an illustrated acuity width 430. Notably, because FIG. 4-1 illustrates single vision correction, the angle of the user's gaze—whether gazing upwards through a SVC lens, directly forward through the SVC lens, or downward through the SVC lens—does not affect the distances in which objects appear to the user with good visual acuity through that SVC lens.

FIG. 4-2 illustrates multifocal correction for a presbyopic user's eye 405 in relation to an angle of that user's gaze through a progressive lens—or, if utilized within a multilayer lens structure, a lens layer providing an MFC optical component. In a manner similar to that presented in FIG. 4-1, the user's accommodation amplitude AA is again a single diopter, as depicted via the illustrated acuity width 430. However, because FIG. 4-2 illustrates multifocal correction, the angle of the user's gaze—gazing upwards through the progressive lens, directly forward through the progressive lens, or downward through the progressive lens—corresponds to varying distances at which objects appear to the user with good visual acuity through that lens.

In the illustration of FIG. 4-2, an accompanying optical power graph 450 includes a power axis 455 (the x-axis) indicating corrective optical power as measured in diopters, and a distance axis 460 (the y-axis) indicating a vertical position of the progressive lens at which the associated optical power is in effect, with the progressive lens' vertical midline designated as +0 mm. In the example of FIG. 4-2, the corrective optical power provided by the progressive lens gradually shifts from +2.00 diopters at a position of −12 mm (12 mm below the midline) to 0.00 diopters at a position of +8 mm (8 mm above the midline). Such a configuration is not unusual for a progressive lens associated with a prescription for a presbyopic user that needs vision correction for near objects. In various embodiments, if the user also needs vision correction for far objects, an additional SVC component may be added to a multilayer lens structure via one or more additional lens layers.

In various embodiments, generating a specification for a multilayer lens structure may include one or more of (1) limiting a relative and respective magnitude of WSS, ESS and DS; (2) shaping and positioning the multifocal components in the user's field of view, and (3) shaping and positioning the AR display in the user's field of view. Such specifications are typically generated in order to maintain good multifocal correction of the real world while optimizing the size and shape of the region in which the AR display can be presented to the user with good visual acuity.

A user may view the AR display with good visual acuity if that AR display is processed through ESSVC. Moreover, if the combined WSS, DSS, and DS adjustments do not shift the display position outside the user's effective accommodation amplitude, the visual acuity with which the user views the AR display will continue to be good. In certain embodiments, therefore, generating the lens structure specification includes determining relative strength and position of the WSMFC and ESMFC to maintain the perceived AR display position inside the effective accommodation amplitude.

In various embodiments and scenarios, generating a lens structure specification may include shifting a portion or the entirety of any MFC component to world side or eye side layers of a multilayer lens structure. For example, if all MFC correction is assigned to a WS lens layer, the eye side of the lens structure becomes equivalent of either a plano or single-vision correction. This may simplify production of those lens layers used for the eye side, but results in corresponding complexity for production of the bespoke WS lens layer. Alternatively, if all MFC correction is assigned to an ES lens layer, WS lens layers may be more easily produced, but typically complicates production of ES lens layers. As a third example, the lens structure specification may indicate to share MFC corrective power between WS and ES lens layers. In this scenario, an ES MFC component may utilize less progressive optical power, indicating more ES lens layer design flexibility, and may allow the WS MFC component to simplify production by utilizing one of a finite quantity of "standardized" optical power designs.

In certain embodiments and scenarios, a multifocal lens structure includes ESSVC and TMFC. In such scenarios, the ESSVC is applied uniformly at all user eye gaze angles, while the TMFC varies with gaze angle. The perceived display position can be shifted using WSS, ESS, and DS. WSS, ESS, and DS can create a shifted display effective accommodation amplitude. There will be regions where the TMFC's WSMFC fall inside the shifted display effective accommodation amplitude. Configuring the display shape and size to fall within this acceptable effective accommodation amplitude range will allow good display visual acuity.

Thus, in certain embodiments, an LSS computing system executing one or more techniques described herein may generate a lens structure specification that includes any or all of limiting WSS/ESS/DS, sculpting WSMFC/ESMFC to create and/or modify a region of one or more MFC components assigned to layers of the lens structure, and determining and/or modifying the AR display position and size based on the position and size of such a region. These actions may combine to enable the user to view an AR display of the lens structure with good visual acuity, while not interfering with that user's use of multifocal spectacles to view the real world. It will be appreciated that in various scenarios and embodiments, each of these actions may be determined by the LSS computing system to be used independently or in conjunction with one another.

Figure 5:
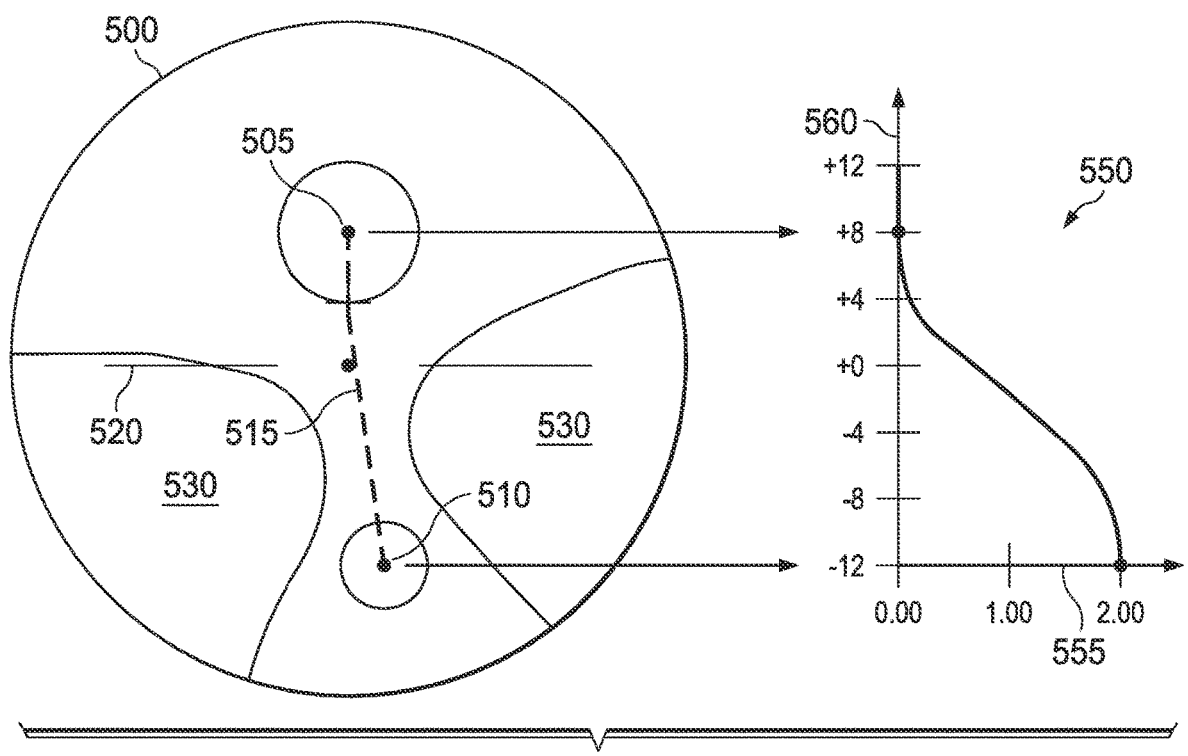
FIG. 5 presents a simplified schematic view of a lens layer used to implement a multifocal corrective component, such as may be used in a multilayer lens structure specified in accordance with certain embodiments.

FIG. 5 presents a simplified schematic view of a lens layer 500 used to implement a multifocal corrective component, such as may be used in a lens structure according to certain embodiments. An optical power graph 550 is also included in FIG. 5 to visually represent the optical power utilized at certain locations of the lens layer.

The lens layer 500 includes various regions that are each associated with various progressive levels of optical power used for vision correction. A distance reference point (DRP) 505 indicates an area of the lens layer used to see distant objects via the lens layer; a near reference point (NRP) 510 indicates an area of the lens layer used to see near objects via the lens layer. A corridor 515 indicates a path between the DRP 505 and the NRP 510, along which the optical power gradually changes between those two areas. Two astigmatic transition zones 530 indicate regions of the lens layer 500 on either side of the corridor 515 with diminished visual acuity. In addition, an equilibrium line 520 is included to indicate a midline position of the lens layer 500 from which a vertical distance on the lens layer is measured.

The optical power graph 550 includes a power axis 555 (the x-axis) indicating a corrective optical power as measured in diopters, and a distance axis 560 (the y-axis) indicating the vertical position at which the associated optical power is in effect. Thus, in the example lens layer of FIG. 5, the DRP 505 is located 8 mm above the midline 520 and has a corrective optical power of 0.00, while the NRP 510 is located 12 mm below the midline with a corrective optical power of +2.00 diopters. It will be appreciated that this arrangement is not unusual for an MFC component associated with a prescription for a presbyopic user that needs vision correction for near objects. In various embodiments, if the user needs vision correction for far objects, an additional SVC component may therefore be added to a multilayer lens structure via one or more additional lens layers.

Figure 6:
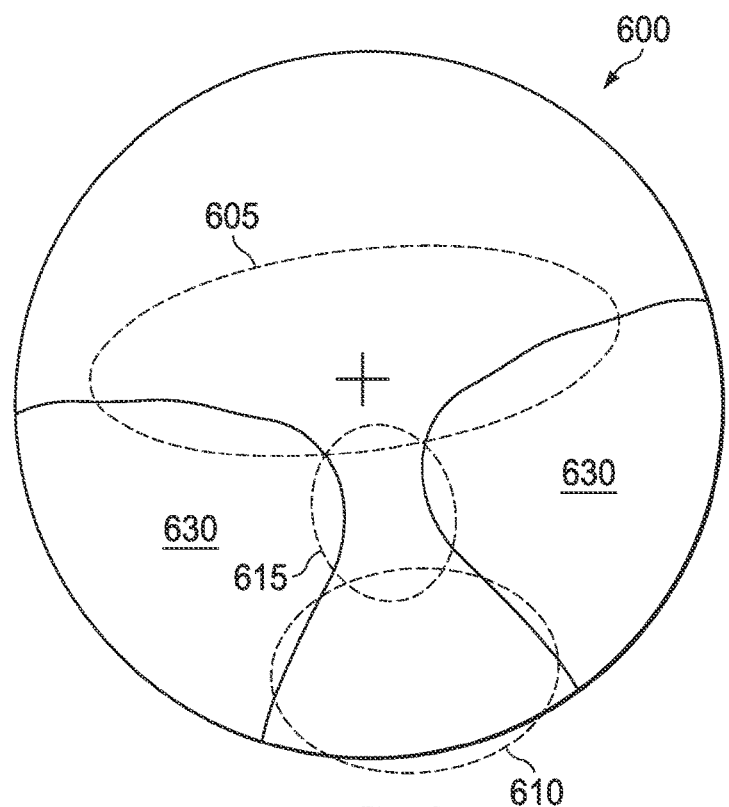
FIG. 6 presents a simplified schematic view of a lens layer used to implement a multifocal corrective component, such as may be used in a multilayer lens structure specified in accordance with certain embodiments.

FIG. 6 presents a simplified schematic view of another lens layer 600. In this depicted example, a distance viewing region 605 transitions to a near viewing region 610 via an intermediate vision region 615, which is analogous to the corridor 515 of lens layer 500 in FIG. 5. Two astigmatic "blending regions" 630 have reduced visual acuity as a result of blending the optical power across those regions of the lens layer.

Figures 1, 7:
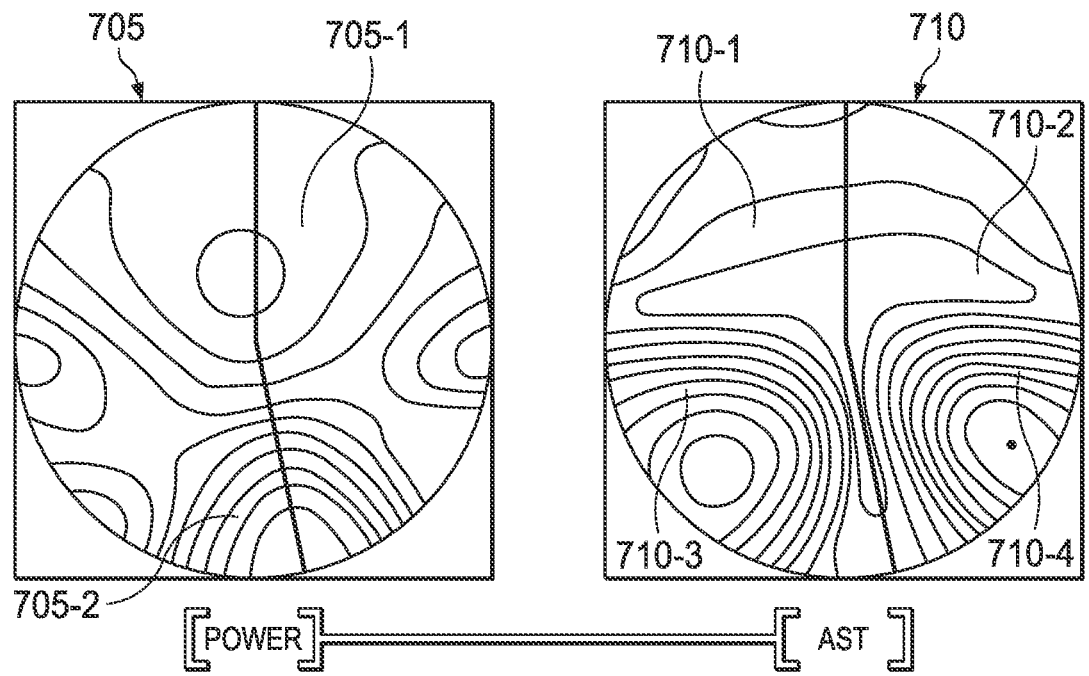
Figures 2, 7:
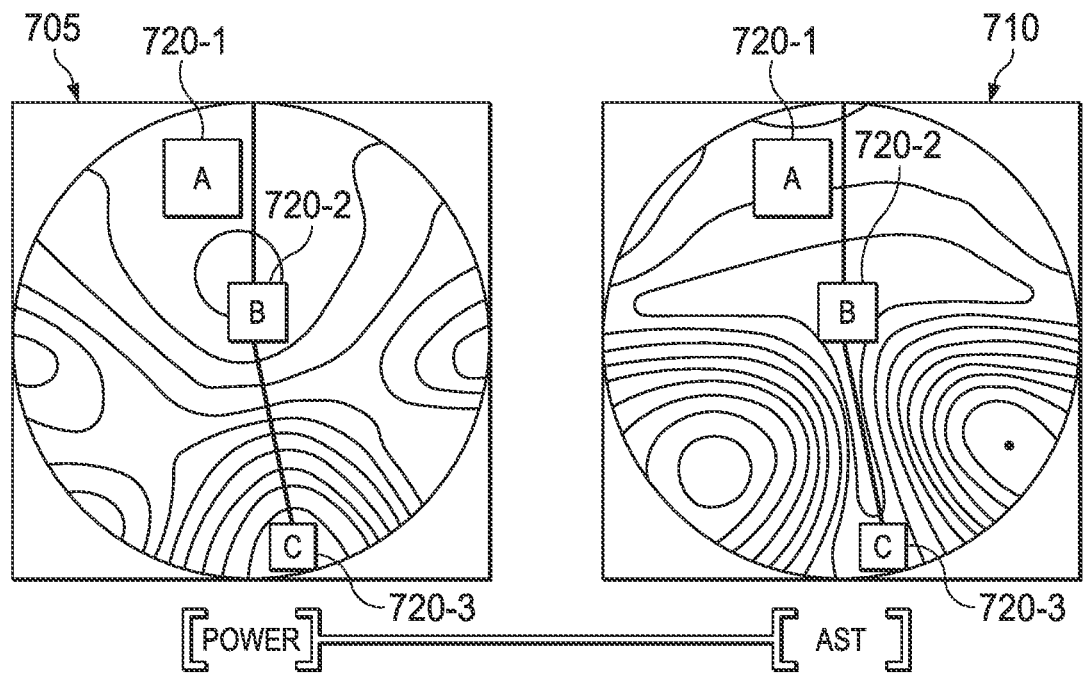
Figures 3, 7:
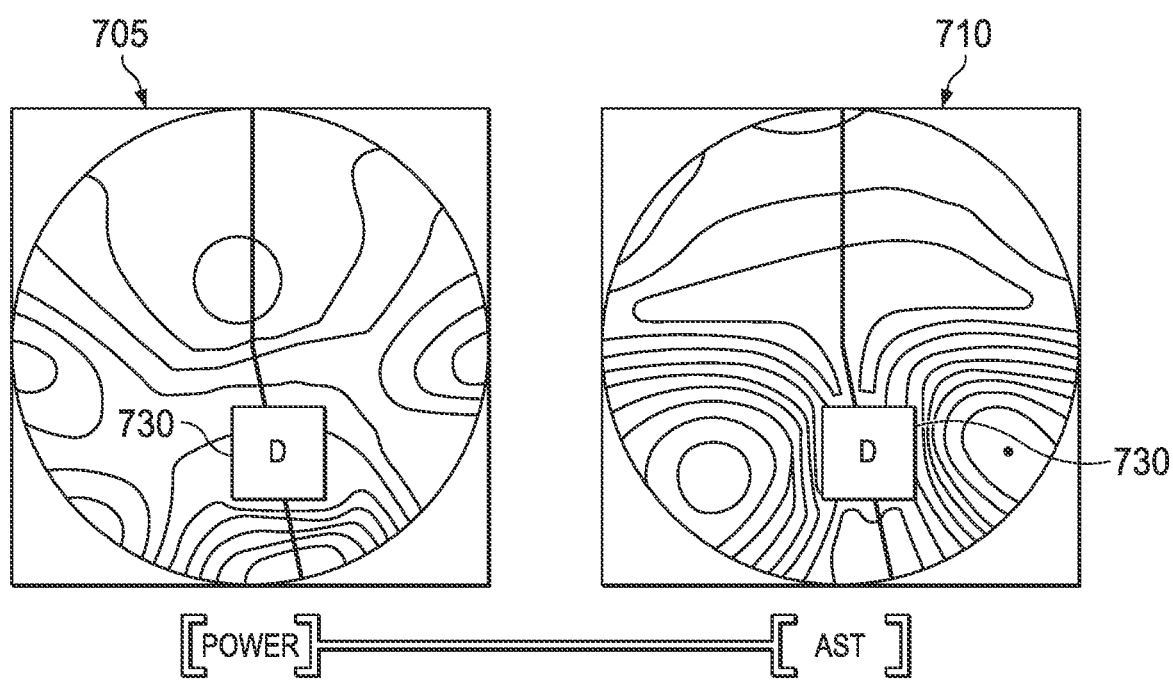

FIG. 7-1 illustrates topographical visualizations of an MFC lens layer, such as may be utilized within a multilayer lens structure specified by one or more embodiments of an LSS system in accordance with techniques described herein. In particular, optical power diagram 705 indicates a two-dimensional topographical representation of relative optical power provided via a lens layer assigned an MFC component, with astigmatic distortion diagram 710 indicating a similar two-dimensional topographical representation of relative astigmatic distortion provided via that same lens layer. In both topographical representations, lines occurring relatively close to one another (such as in areas 705-2, 710-3, and 710-4) indicate a relatively rapid change in optical power or astigmatic distortion, respectively, while lines occurring relatively far apart (such as in areas 705-1, 710-1, and 710-2) indicate a relatively low degree of change in that optical power or astigmatic distortion.

FIG. 7-2 illustrates the topographical representations of optical power and astigmatic distortion provided by the MFC lens layer presented in FIG. 7-1, with the addition of three distinct regions identified by the LSS system as candidates for placement of an AR display in a corresponding DO layer of a multilayer lens structure. In particular, in the depicted lens layer, the LSS system has analyzed the relative changes to optical power and astigmatic distortion across various areas of the MFC lens layer to identify a first relatively large region 720-1 ("A"), a second midsized region 720-2 ("B"), and a smaller region 720-3 ("C"). It will be appreciated that these regions are each located in areas of the MFC lens layer having relatively low changes in optical power or astigmatic distortion. In various embodiments, criteria specified for the AR display may allow the LSS system to select one of these three regions for placement of the AR display without additional modification to the MFC lens layer.

FIG. 7-3 illustrates the topographical representations of optical power and astigmatic distortion provided by the MFC lens layer presented in FIG. 7-1. Here, the LSS system has determined that none of the "A," "B," or "C" regions are suitable for placement of the AR display. For example, the LSS system may have determined that region "A" has an appropriate size and acceptable change of optical power and/or astigmatic distortion, but would result in an undesirable location for placement of the AR display due to its position towards the top of the resulting lens structure. Similarly, the LSS system may determine that regions "B" and "C" are located in a more desirable location of the lens structure, but are too small to satisfy the desired criteria for the AR display.

As a result of such determinations, in the embodiment of FIG. 7-3, the LSS system has determined to make one or more modifications to the MFC lens layer in order to create or "sculpt" the MFC lens layer within and around region 730, and thereby make room for corresponding placement of the AR display within the DO layer of the multilayer lens structure. In various embodiments and scenarios, for example, such modifications may include limiting a change of optical power within the region 730, modifying a size and/or shape of the region 730, and modifying a location of the region 730. As a result of the modifications made by the LSS system in the embodiment of FIG. 7-3, region 730 is generally located in the corridor between a distance reference point and near reference point for the MFC lens layer, with a larger area than would be possible without such modifications, as seen in contrast to the "A," "B," and "C" regions identified in FIG. 7-2. Moreover, although not shown in the embodiment of FIG. 7-3, in certain embodiments and scenarios the LSS system may determine to sculpt or otherwise modify a region in an astigmatic transition zone (e.g., areas 710-3 and/or 710-4 of FIG. 7-1) to make room for corresponding placement of the AR display within the DO layer of the multilayer lens structure.

Figure 8:
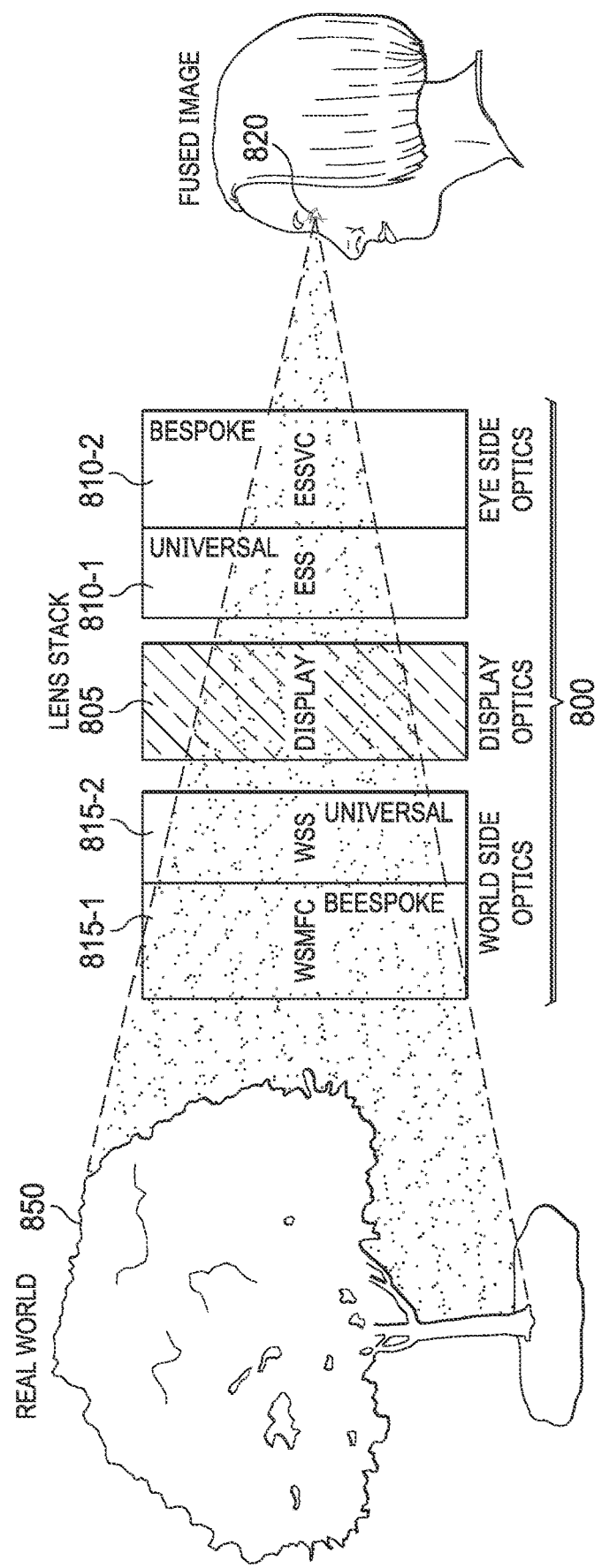
FIGS. 8 and 9 present block diagrams of examples of multilayer lens structures designed and/or specified by one or more implementations of an LSS system in accordance with certain embodiments.
Figure 9:
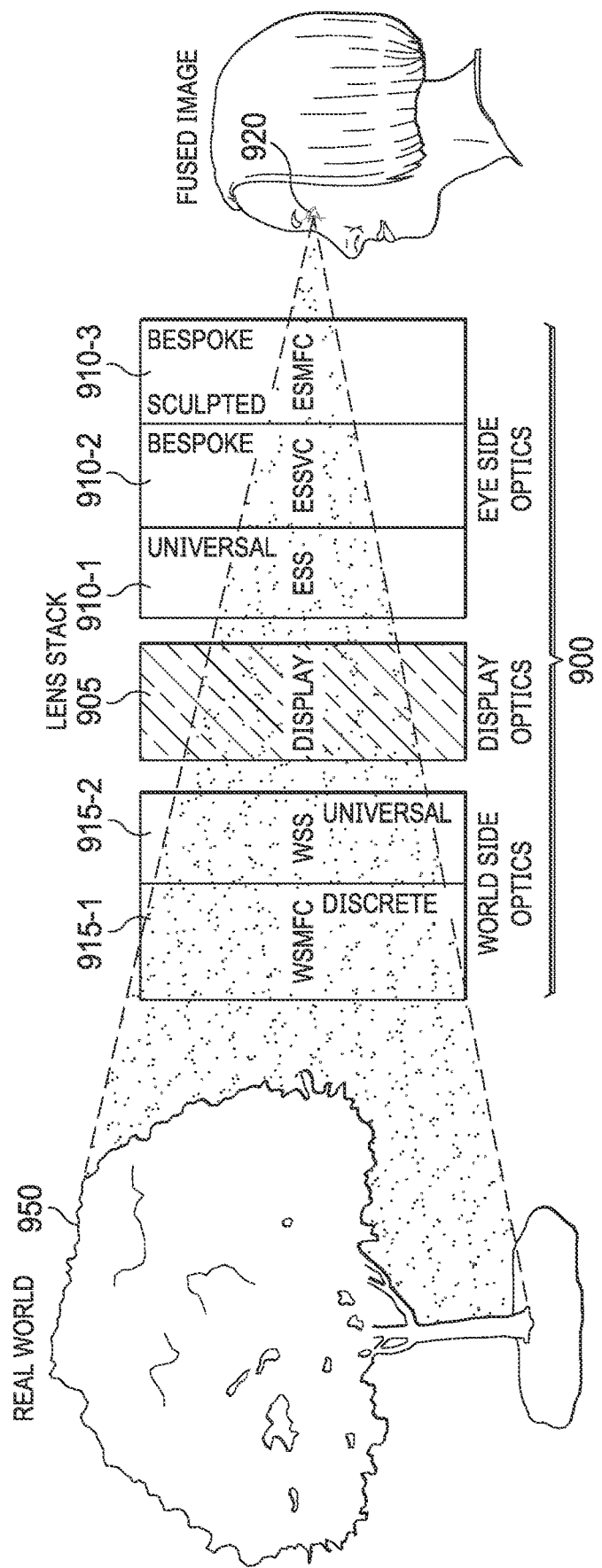

FIGS. 8 and 9 present block diagrams of two distinct examples of multilayer lens structures designed and/or specified by one or more implementations of an LSS system executing one or more techniques described herein. In particular, FIG. 8 presents a block diagram of a multilayer lens structure 800, with FIG. 9 presenting a block diagram of a multilayer lens structure 900. As with the lens structure 300 depicted in FIG. 3, each of the multilayer lens structures 800 and 900 respectively presented by FIGS. 8 and 9 may be used as a single "lens" for use as part of the wearable display device 100 of FIG. 1 and/or wearable display device 200 of FIG. 2.

In the depicted embodiment of FIG. 8, a lens structure 800 includes a display optics (DO) layer 805. The lens structure 800 further includes two ES lens layers (810-1 and 810-2) disposed between the DO layer and an eye of a user 820, and two WS lens layers (815-1 and 815-2) disposed between the DO layer and the real world 850. In this example, the LSS system has determined to assign all MFC components to a single WS layer 815-1, and to assign all SVC components to a single ES layer 810-2. In addition, in order to shift the perceived display distance at which an AR display of the DO layer 805 appears to the user's eye 820, the LSS system has assigned distance shift components to ES layer 810-1 and WS layer 815-2, respectively. As discussed elsewhere herein, in certain embodiments these respective DS components may be configured by the LSS system to have equal but opposing magnitudes, such as to affect the perceived display distance of the AR display without otherwise affecting the optical correction provided by the lens structure 800 with respect to the user's perception of the real world 850. For purposes of manufacturing the resulting lens structure 800, the depicted example notes that the user-specific prescription components of WS layer 815-1 and ES layer 810-2 are bespoke with respect to the user, while the WS layer 815-2 and ES layer 810-1 may utilize layer components that are "universal"—that is, common with respect to many users. For example, the distance shift provided by these universal layers may be common to a large number of users with similar or overlapping effective accommodation amplitudes.

In the depicted embodiment of FIG. 9, a lens structure 900 includes a display optics (DO) layer 905. The lens structure 900 further includes three ES lens layers (910-1, 910-2, and 910-3) disposed between the DO layer and an eye of a user 920, and two WS lens layers (915-1 and 915-2) disposed between the DO layer and the real world 950. In this example, the LSS system has determined to split the MFC components between WS layer 915-1 and ES layer 910-3, such as to provide both a customized or bespoke ESMFC layer 910-3 with a sculpted region to accommodate an AR display of the DO layer 905, as well as a discrete WSMFC layer 915-1 that may include an MFC component, and to multiple users (and therefore more readily configured and/or manufactured). As with the lens structure 800 of FIG. 8, the LSS system has assigned all SVC components to a single ES layer 910-2, and assigned distance shift components to ES layer 910-1 and WS layer 915-2, respectively.

Figure 10:
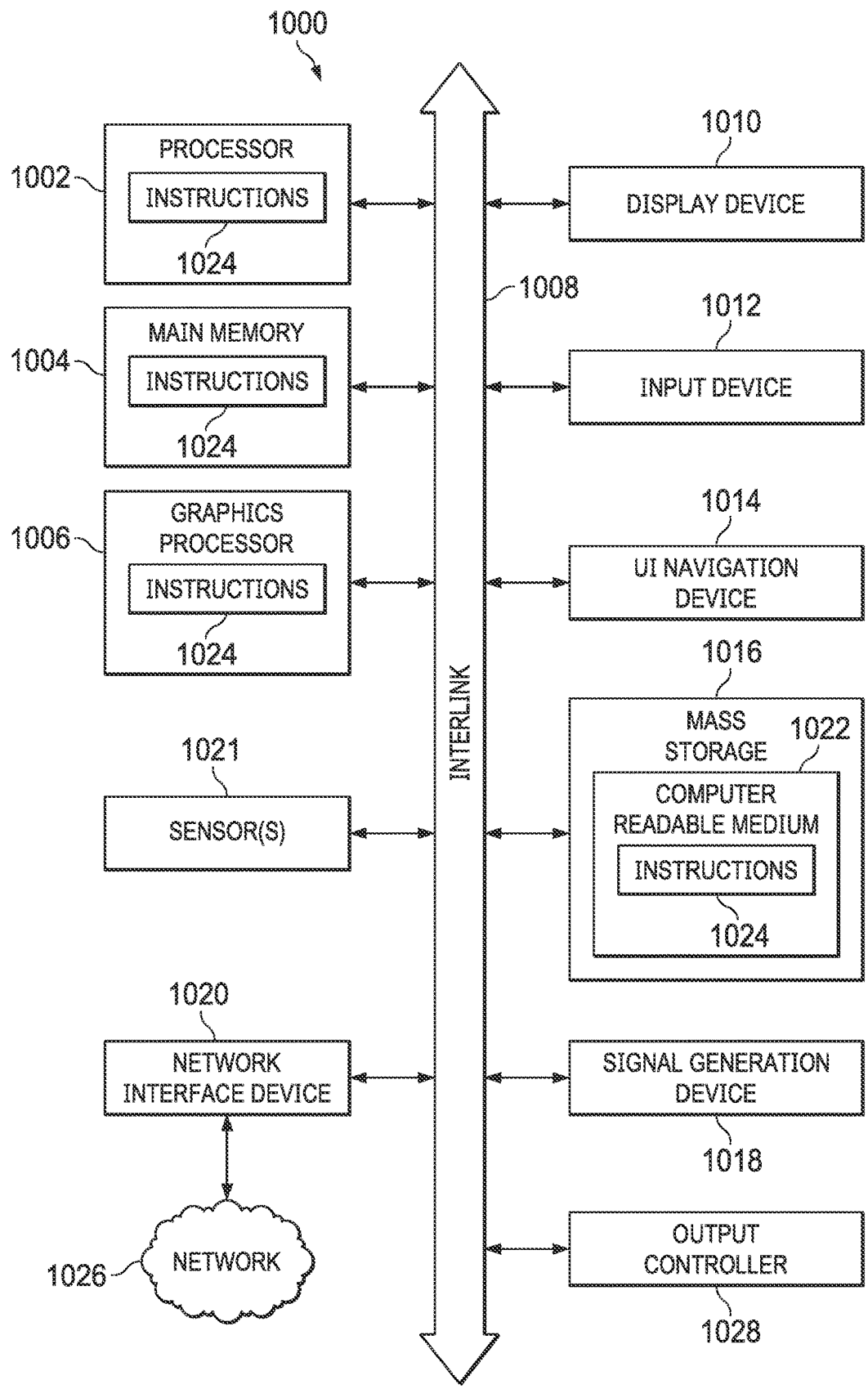
FIG. 10 is a component-level block diagram illustrating an example of an LSS computing system suitable for implementing one or more embodiments.

FIG. 10 is a component-level block diagram illustrating an example of an LSS computing system 1000 suitable for implementing one or more embodiments. In alternative embodiments, the LSS computing system 1000 may operate as a standalone device or may be connected (e.g., networked) to other systems. In various embodiments, one or more components of the LSS computing system 1000 may be incorporated as or within one or more server computing systems to provide various types of lens structure analysis and specification. It will be appreciated that an associated server computing device may include some components of LSS computing system 1000, but not necessarily all of them. In a networked deployment, the LSS computing system 1000 may operate in the capacity of a server machine, a client machine, or both in server-client network environments. In at least one example, the LSS computing system 1000 may act as a peer system in peer-to-peer (P2P) (or other distributed) network environment. The LSS computing system 1000 may be a server computer, a personal computer (PC), a tablet PC, a set-top box (STB), a mobile computing device, a web appliance, a network router, switch or bridge, or any system capable of executing instructions (sequential or otherwise) that specify actions to be taken by that system. Further, while only a single system is illustrated, the term "system" shall also be taken to include any collection of systems that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer readable medium physically modified (e.g., magnetically, electrically, movable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

The LSS computing system 1000 may include one or more hardware processors 1002 (e.g., a central processing unit (CPU), a hardware processor core, or any combination thereof), a main memory 1004, and a graphics processing unit (GPU) 1006, some or all of which may communicate with each other via an interlink (e.g., bus) 1008. The LSS computing system 1000 may further include a display unit 1010 (such as a display monitor or other display device), an alphanumeric input device 1012 (e.g., a keyboard or other physical or touch-based actuators), and a user interface (UI) navigation device 1014 (e.g., a mouse or other pointing device, such as a touch-based interface). In one example, the display unit 1010, input device 1012, and UI navigation device 1014 may include a touch screen display. The LSS computing system 1000 may additionally include a storage device (e.g., drive unit) 1016, a signal generation device 1018 (e.g., a speaker), a network interface device 1020, and one or more sensors 1021, such as a global positioning system (GPS) sensor, compass, accelerometer, or other sensor. The LSS computing system 1000 may include an output controller 1028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1016 may include a computer readable medium 1022 on which is stored one or more sets of data structures or instructions 1024 (e.g., software) embodying or utilized by any one or more of the techniques or functions described herein. The instructions 1024 may also reside, completely or at least partially, within the main memory 1004, within GPU 1006, or within the hardware processor 1002 during execution thereof by the LSS computing system 1000. In an example, one or any combination of the hardware processor 1002, the main memory 1004, the GPU 1006, or the storage device 1016 may constitute computer readable media.

While the computer readable medium 1022 is illustrated as a single medium, the term "computer readable medium" may include a single medium or multiple media (e.g., a centralized or distributed database, and/or associated caches and servers) configured to store the one or more instructions 1024.

The term "computer readable medium" may include any medium that is capable of storing, encoding, or carrying instructions for execution by the LSS computing system 1000 and that cause the LSS computing system 1000 to perform any one or more of the techniques of the present disclosure, or that is capable of storing, encoding or carrying data structures used by or associated with such instructions. Non-limiting computer readable medium examples may include solid-state memories, and optical and magnetic media. In an example, a massed computer readable medium includes a computer readable medium with a plurality of particles having invariant (e.g., rest) mass. Accordingly, massed computer readable media are not transitory propagating signals. Specific examples of massed computer readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1024 may further be transmitted or received over a communications network 1026 using a transmission medium via the network interface device 1020 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax), IEEE 802.15.4 family of standards, peer-to-peer (P2P) networks, among others. In an example, the network interface device 1020 may include one or more physical jacks (e.g., Ethernet, coaxial, or phone jacks) or one or more antennas to connect to the communications network 1026. In an example, the network interface device 1020 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the LSS computing system 1000, and includes digital or analog communications signals or other intangible medium to facilitate communication of such software.

Figure 11:
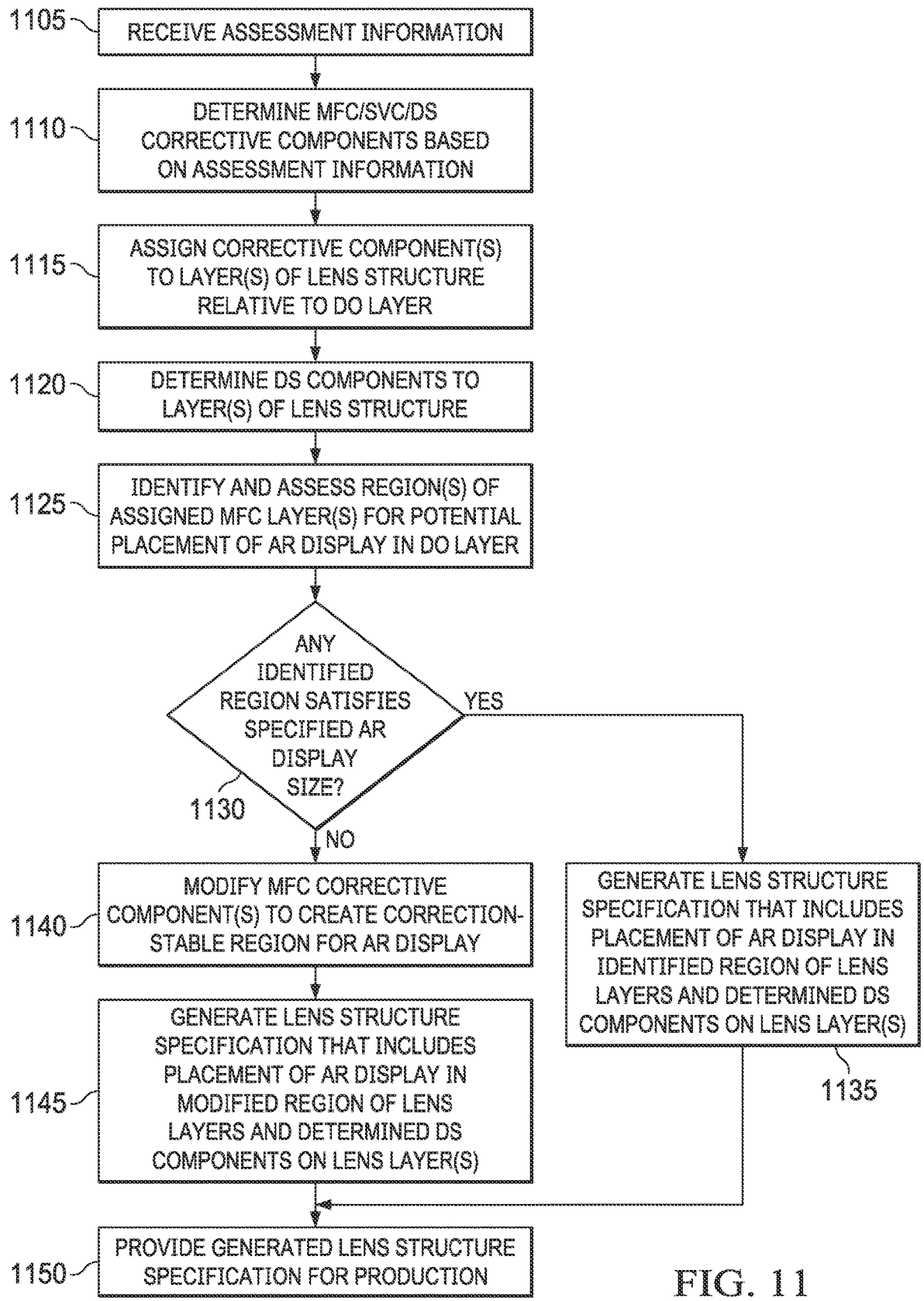
FIG. 11 is a block diagram illustrating an overview of an operational routine 1100 of a processor-based LSS system in accordance with one or more embodiments.

FIG. 11 is a block diagram illustrating an overview of an operational routine 1100 of a processor-based device in accordance with one or more embodiments. The routine may be performed, as one non-limiting example, by one or more implementations of the LSS computing system 1000 of FIG. 10, as well as one or more other embodiments.

The routine begins at block 1105, in which the processor-based device receives assessment information regarding optical vision correction associated with a user (e.g., an optometric or other medical patient). In certain embodiments, such assessment information may include, as non-limiting examples: information regarding a user's bespoke vision prescription, indicating a measured corrective power determined for the user to perceive the real world with high visual acuity; information regarding an eyeglass frame selection for the user; demographic information regarding the user (e.g., an age, gender, or other demographic segment associated with the user); etc. The routine then proceeds to block 1110.

At block 1110, the processor-based device determines one or more corrective components for use in generating a lens structure specification based on the received assessment information. For example, the processor-based device may determine one or more multifocal corrective components and/or one or more single-vision corrective components, as well as a distance-shifting component if applicable. The routine then proceeds to block 1115.

At block 1115, the processor-based device assigns the determined corrective components (whether MFC, SVC, DS, or combination thereof) to individual layers of the multilayer lens structure, typically in relation to a centrally disposed DO layer that is to include one or more elements of an AR display. The routine then proceeds to block 1120.

At block 1120, the processor-based device determines whether to assign one or more DS components to one or more layers of the lens structure, such as to shift the perceived distance of any AR display to a distance within the user's accommodation amplitude (or effective accommodation amplitude). As one non-limiting example, in certain embodiments and scenarios determining to shift the perceived distance of an AR display in this manner may result in the processor-based device determining to assign a first DS component to an ES layer, and to assign a second DS component of equal but opposite optical power to a WS layer. The routine then proceeds to block 1125.

At block 1125, the processor-based device identifies and assesses one or more regions of lens layers within the lens structure that are to be assigned an MFC component to determine whether any of those assessed regions satisfy one or more criteria for potential placement of an AR display included in the DO layer of the lens structure. In certain embodiments, the area in which such regions are to be assessed/identified may be less than the total area of the lens layer, such as to evaluate only areas for which it is desirable to place the AR display. As one example, certain studies have indicated that a user may review contents of an AR display located in the lower and/or inner (e.g., more nose-adjacent) portions of an eyeglass lens without causing significant social disruption during conversation with others, while potential social disruption is typically increased if the AR display causes the user to instead gaze towards the upper or outer areas. Thus, in certain embodiments certain portions of the lens structure may be excluded from consideration when region selection criteria are applied. After the MFC-assigned layer or layers have been assessed, the routine proceeds to block 1130.

At block 1130, the processor-based device determines whether any region of the assessed MFC-assigned layer or layers satisfies one or more defined criteria for placement of the AR display, such as criteria specified for a size or shape of that AR display.

If in block 1130 the processor-based device determines that at least one identified region of the assessed layer or layers satisfies defined criteria for the AR display, the routine proceeds to block 1135, in which the processor-based device generates a lens structure specification that includes placement of the AR display in the identified region, the assigned MFC components, and any SVC components for use in one or more layers of the lens structure, as well as any DS components determined for use in the lens structure.

If in block 1130 the processor-based device determined that none of the assessed regions of the MFC-assigned lens layers satisfy the defined criteria for placement of the AR display, the routine proceeds to block 1140, in which the processor-based device modifies one or more of the assigned MFC components in order to create a suitable region for the AR display. As non-limiting examples, in various embodiments and scenarios such modifications may include limiting a change of optical power within a region identified for use in placement of the AR display; modifying a size and/or shape of the region; and/or modifying a location of the region. The routine then proceeds to block 1145.

In block 1145, the processor-based device generates a lens structure specification that includes placement of the AR display in the modified region, the assigned MFC components, and any SVC components for use in one or more layers of the lens structure, as well as any DS components determined for use in the lens structure.

After blocks 1135 or 1140, the routine proceeds to block 1150, in which the processor-based device provides the generated lens structure specification for use in production of the specified lens structure, such as for provision of the lens structure as part of eyeglasses and AR display to (and use by) the user associated with the assessment information received in block 1105.

In some embodiments, certain aspects of the techniques described above may be implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A lens structure having multiple lens layers, the lens structure comprising:
    a display optics (DO) lens layer comprising an augmented reality (AR) display, the DO lens layer having a first side for facing an eye of a user and a second side for facing away from the eye of the user;
    one or more eye side (ES) lens layers disposed adjacent to the first side of the DO lens layer; and
    one or more world side (WS) lens layers disposed adjacent to the second side of the DO lens layer;
    wherein a first lens layer of the multiple lens layers includes a multifocal corrective (MFC) component, and wherein the AR display is positioned based at least in part on a size and location of a first region of the first lens layer, the MFC component within the first region satisfying a defined threshold for a maximum total change in optical power.

2. The lens structure of claim 1, wherein
    the first lens layer is a first ES lens layer of the one or more ES lens layers.

3. The lens structure of claim 1, wherein the MFC component of the first lens layer is based on assessment information regarding optical vision correction for a user, and wherein the MFC component in the first region is modified responsive to analyzing one or more regions of the first lens layer.

4. The lens structure of claim 3, wherein to modify the MFC component in the first region includes to take at least one action of a group of actions that includes:
    limiting a change of optical power within the first region;
    modifying a size and/or shape of the first region; and
    modifying a location of the first region.

5. The lens structure of claim 1, wherein
    the first lens layer is a first WS lens layer of the one or more WS lens layers.

6. The lens structure of claim 5, wherein the MFC component of the first WS lens layer is based on assessment information regarding optical vision correction for a user, and wherein the MFC component in the first region is modified responsive to analyzing one or more regions of the first WS lens layer.

7. The lens structure of claim 6, wherein to modify the MFC component in the first region includes to take at least one action of a group of actions that includes:
    limiting a change of optical power within the first region;
    modifying a size and/or shape of the first region; and
    modifying a location of the first region.

8. The lens structure of claim 1, wherein:
    the one or more ES lens layers includes a first distance shift (DS) component; and
    the one or more WS lens layers includes a second DS component that has an equal but opposite optical power as the first DS component.

9. The lens structure of claim 8, wherein the first lens layer is a first WS lens layer and wherein the second DS component is provided by a second WS lens layer that is disposed between the DO lens layer and the first WS lens layer.

10. The lens structure of claim 1, wherein the AR display of the DO lens layer comprises an incoupling light guide and an outcoupling light guide, and wherein the outcoupling light guide is positioned based at least in part on assessing a change in optical power within one or more regions of at least one lens layer of the multiple lens layers.

11. The lens structure of claim 10, wherein a size for the outcoupling light guide is determined based at least in part on the assessing of the change in optical power within the one or more regions.

12. The lens structure of claim 1, wherein the MFC component in the first region is modified, based at least in part on a position of the AR display of the DO lens layer, to include the first region.

13. The lens structure of claim 1, wherein at least one lens layer of the multiple lens layers is assigned a set of plano parameters, such that the at least one lens layer has no optical corrective components.

14. A method comprising:
    generating, by one or more processors and based at least in part on assessment information regarding optical vision correction for a user, a lens specification for multiple lens layers of a lens structure, the generating including:
        assigning a multifocal correction (MFC) component to a first lens layer of the multiple lens layers;
        analyzing one or more regions of the first lens layer to identify a first region in which a change in optical power of the MFC component satisfies a defined threshold for a maximum total change in optical power;
        generating one or more parameters for a display optics (DO) lens layer comprising an augmented reality (AR) display, the DO lens layer having a first side for facing an eye of the user and a second side for facing away from the eye of the user; and
        determining a position in which to place the AR display based at least in part on a location of the first region of the first lens layer
        and
    providing, by the one or more processors, the generated lens specification for use in production of the lens structure for the user.

15. The method of claim 14, wherein assigning the MFC component to the first lens layer includes assigning a MFC component to one or more eye side (ES) lens layers of the multiple lens layers, the ES lens layers to be disposed adjacent to the first side of the DO lens layer.

16. The method of claim 14, further comprising:
    responsive to analyzing the one or more regions of the first lens layer, determining to modify the first region by modifying the MFC component assigned to the first lens layer.

17. The method of claim 16, wherein to modify the MFC component assigned to the first lens layer includes to modify the MFC component by taking at least one action of a group of actions that includes:
    limiting a change of optical power within the first region;
    modifying a size and/or shape of the first region; and
    modifying a location of the first region.

18. The method of claim 14, wherein assigning the MFC component to the first lens layer includes assigning a MFC component to one or more world side (WS) lens layers of the multiple lens layers, the WS lens layers to be disposed adjacent to the second side of the DO lens layer.

19. The method of claim 14, wherein generating the lens specification further comprises generating parameters for one or more additional lens layers of the multiple lens layers.

20. The method of claim 14, wherein generating the lens specification comprises:

assigning a first distance shift (DS) component to at least one ES lens layer of the one or more ES lens layers; and assigning a second DS component to at least one WS lens layer of the one or more WS lens layers, the second DS component having an equal but opposite optical power as the first DS component.

21. The method of claim 20, wherein the first lens layer is a first WS lens layer, and wherein the at least one WS lens layer is disposed between the DO lens layer and the first WS lens layer.

22. The method of claim 14, wherein the AR display of the DO lens layer comprises an incoupling light guide and an outcoupling light guide, and wherein generating the lens specification includes determining a position in which to place the outcoupling light guide based at least in part on assessing a change in optical power within one or more regions of at least one lens layer of the multiple lens layers.

23. The method of claim 14, wherein generating the lens specification further includes modifying a corrective component of the first lens layer to create the first region of the first lens layer.

24. The method of claim 14, further comprising assigning a set of plano parameters to at least one lens layer of the multiple lens layers, such that the at least one lens layer has no optical corrective components.

25. A non-transitory computer readable medium embodying a set of executable instructions, the set of executable instructions to manipulate at least one processor to perform the method of claim 14.

26. A head wearable display (HWD) device that includes a lens structure having multiple lens layers, the lens structure comprising:

a display optics (DO) lens layer comprising an augmented reality (AR) display, the DO lens layer having a first side for facing an eye of a user and a second side for facing away from the eye of the user;

one or more eye side (ES) lens layers disposed adjacent to the first side of the DO lens layer; and one or more world side (WS) lens layers disposed adjacent to the second side of the DO lens layer;

wherein a first lens layer of the multiple lens layers includes a multifocal corrective (MFC) component, and wherein the AR display is positioned based at least in part on a size and location of a first region of the first lens layer, the MFC component within the first region satisfying a defined threshold for a maximum total change in optical power.

27. The HWD device of claim 26, wherein
the first lens layer is a first ES lens layer of the one or more ES lens layers.

28. The HWD device of claim 26, wherein the MFC component of the first lens layer is based on assessment information regarding optical vision correction for a user, and wherein the MFC component in the first region is modified responsive to analyzing one or more regions of the first lens layer.

29. The HWD device of claim 28, wherein to modify the MFC component in the first region includes to take at least one action of a group of actions that includes:

limiting a change of optical power within the first region;
modifying a size and/or shape of the first region; and
modifying a location of the first region.

30. The HWD device of claim 26, wherein
the first lens layer is a first WS lens layer of the one or more WS lens layers.

31. The HWD device of claim 26, wherein:
a first ES lens layer of the one or more ES lens layers includes a first distance shift (DS) component; and
a first WS lens layer of the one or more WS lens layers includes a second DS component that has an equal but opposite optical power as the first DS component.

* * * * *